Feb. 15, 1966     G. L. MALAN     3,235,230
VIBRATOR
Filed June 3, 1963     3 Sheets-Sheet 1
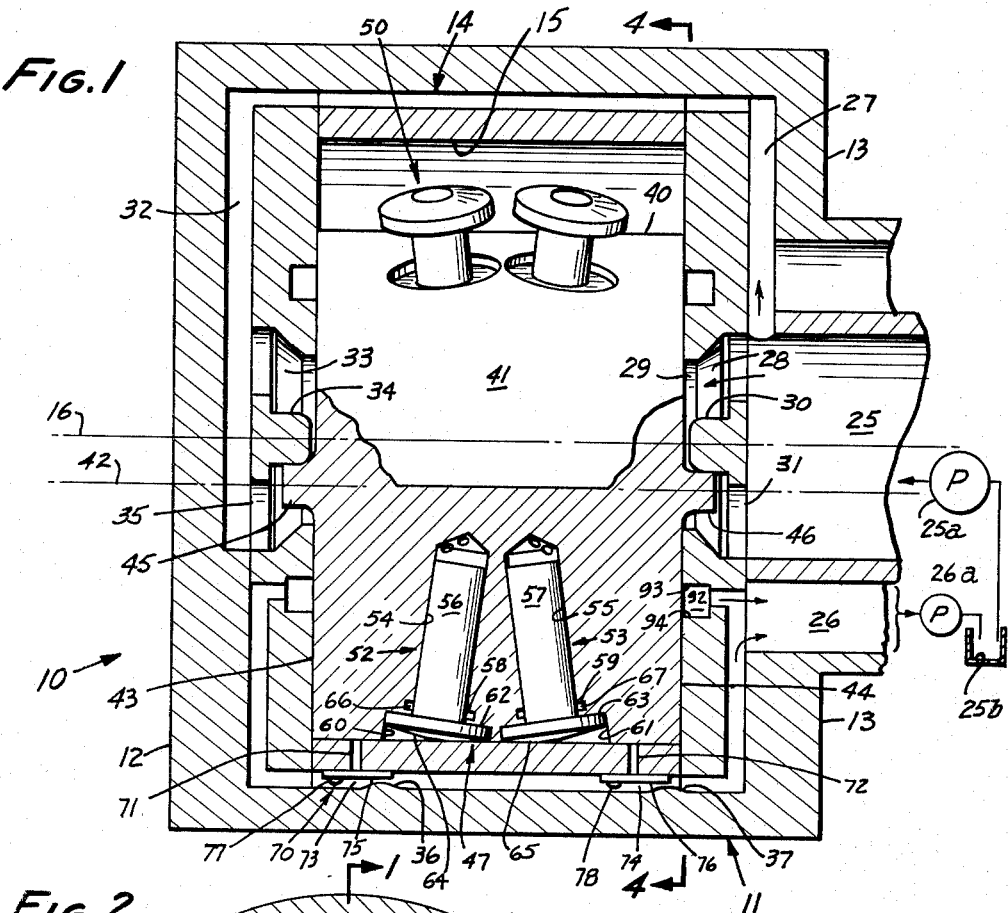
INVENTOR.
GEORGE L. MALAN
BY
*Angus & Mon*
ATTORNEYS.

Feb. 15, 1966

G. L. MALAN 3,235,230

VIBRATOR

Filed June 3, 1963

INVENTOR.
GEORGE L. MALAN

BY Angus & Mon
ATTORNEYS.

Feb. 15, 1966 G. L. MALAN 3,235,230
VIBRATOR
Filed June 3, 1963 3 Sheets-Sheet 3
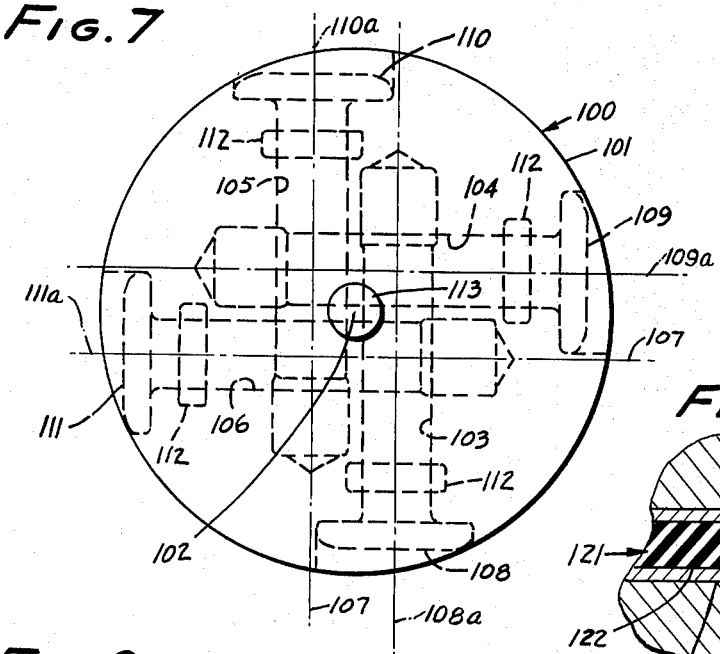
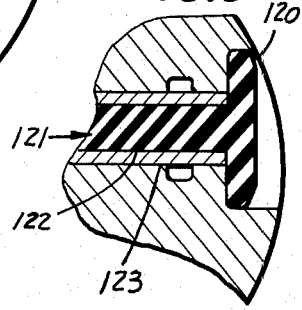
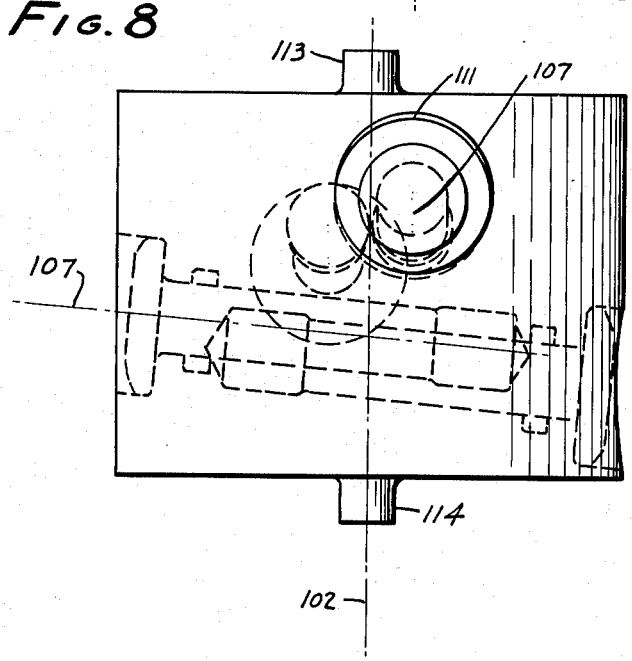
INVENTOR.
GEORGE L. MALAN
BY
*Angus & Mon*
ATTORNEYS.

United States Patent Office 3,235,230
Patented Feb. 15, 1966

3,235,230
VIBRATOR
George L. Malan, 560 E. Rowland, Covina, Calif.
Filed June 3, 1963, Ser. No. 284,904
17 Claims. (Cl. 259—1)

This invention relates to free rotor vibrators.

Free rotor vibrators are generally known from Malan Patents Nos. 2,743,090; 2,988,337; and 2,891,775. Their common characteristic is a cylindrical rotor disposed inside a cylindrical race, where, under the power of a pressurized fluid, such as hydraulic fluid or compressed air, the rotor is caused to roll around the inside of the race, thereby exerting unbalanced lateral vibratory forces which are generally used for purposes such as settling concrete in molds. The only lateral support for the rotor is the race; the rotor is not journaled in bearings.

The class of free rotor vibrator shown in the aforementioned Malan patents generally preferably utilizes the expansive properties of compressed air, and causes the rotor to roll around the race by virtue of forces exerted against the race through vanes or plungers which are carried by the rotor, and by placing regions between the vanes, rotor and race under pressure. By sequentially placing the vanes and regions under relatively higher and lower pressure, it is possible to exert sequential and progressive forces around the surface of the rotor which tends to keep it rolling in the race.

In devices such as the aforementioned, it has been one objective effectively to utilize the regions at the outside of the rotor for providing lateral forces to aid in rolling the rotor, thereby taking advantage of the expansive properties of compressed air. However, there are increasing demands for vibrators which can operate at higher pressures than are customarily available on a job using compressed air, and which therefore would require the use of liquids under pressure for power. In such a situation, it is difficult, although not impossible, to inject and exhaust liquids rapidly enough in the regions around the rotor to obtain the desired speed. However, a more logical design for such a device would be to exert the forces through plungers which reciprocate in cylinders of sensible volume, thereby reducing the throughput of fluid. The fluid can then be used at a relatively high pressure. In such an arrangement, improved performance is obtained by maintaining the region between the race and rotor liquid-free and at as low a pressure as possible. Such a device works quite well, but it has been found that there are several improvements which ought to be made which generally relate to keeping the region between the rotor and the race free of liquids. This is because the energy needed to propel such liquid around the race ahead of the rotor tends markedly to decrease the frequency of the device. Accordingly, an object of this invention is to provide expulsion means for expelling fluids from this region.

Another and allied object of the invention is to prevent such liquids from reaching the region between the race and the rotor in the first place.

Still another object of the invention is to provide a plunger design which is especially adapted for exerting force on the race in a vibrator which accomplishes the aforementioned objectives.

A device according to this invention includes a cylindrical race, and a cylindrical rotor within the race adapted to be rolled around therein. A plurality of plungers is provided in the rotor, each of which plungers is adapted to be extended laterally therefrom by fluid pressure and thus to be pressed against the race, and thereby propel the rotor around the inside of the race. Valving means is provided alternately and sequentially to place the plungers under pressure and exhaust conditions so as to enable them to reciprocate in the rotor, thereby sequentially to exert the desired forces against the wall of the race.

According to a preferred but optional feature of the invention, the plungers comprise cylindrical, rotatable and axially slideable shafts whereby the plungers may be disposed at an oblique angle to the central axis of the rotor and to a normal to the central axis, and thereby make an oblique contact with the race whereby the shafts may rotate and thereby reduce binding forces on the plunger.

According to another preferred but optional feature of the invention, expulsion means is provided for expelling any fluids from the region between the race and the rotor. It is possible by this means to generate a sub-atmospheric pressure within the race.

According to still another preferred but optional feature of the invention, a scavenging groove peripherally surrounds each shaft, and is connected to an exhaust connection, whereby a substantial amount of the leakage past the shaft is diverted to the exhaust region rather than leak into the region between the rotor and the race.

According to still another preferred but optional feature of the invention, the axes of reciprocation of the plunger shafts are offset so that they are skew to the central axis of the rotor. With such an arrangement, an improved torque reaction on the rotor is derived from contact between the plunger and the race, and there is also an increased area of contact between the plunger and the race, which results in diminished wear on both.

The above and other features of this invention will be fully understood from the following detail description and the accompanying drawings in which:

FIG. 1 is a cross-section of the presently preferred embodiment of the invention. The outer race section is taken at line 1—1 of FIG. 2, and the section through the internal rotor is taken at line 1—1 of FIG. 3;

FIG. 2 is an end view of the race portion of FIG. 1;

Figure 5:
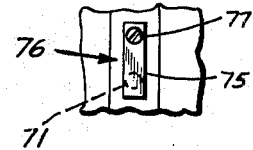
Figure 6:
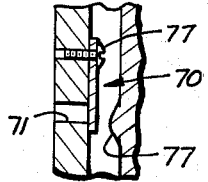

FIGS. 5 and 6 are sections taken at lines 5—5 and 6—6 of FIG. 2;

FIG. 7 is an end view of an optional rotor for use in the invention;

FIG. 8 is a side view of FIG. 7;

FIG. 9 is a cross-section of a portion of FIG. 7; and

FIG. 10 is a fragmentary cross-section showing another embodiment of expulsion means.

A vibrator 10 according to the invention is shown in FIG. 1. It includes an outer housing 11 having a pair of end plates, 12, 13. End plates 12 and 13 are fitted to the ends of the housing to close the same. The race element 14 includes an internal, cylindrical race 15. The cylindrical race has a cylindrical axis 16. The outside surface of the race element has eight axial slots 17–24 which are supplied for providing pressure and exhaust connections between the end plates.

End plate 13 connects with a central pressure passage 25 and a peripheral exhaust passage 26, these commonly being coaxial hoses. Side pressure passages 27 branch to slots 17, 19, 21 and 23. A central pressure passage 28 connects to a pressure valving port 29 in the left-hand surface of end plate 13. A pump 25a or other power supply provides pressurized liquid to pressure passage 25 from reservoir 25b. If desired, an exhaust pump 26a, which may be separately powered, can be connected to the exhaust passage to lower the exhaust pressure and boost the fluid back to the reservoir, and to assist in pumping leakage oil from the region inside the race.

A central nib 30 is held by spider 31 to the end plate for purposes yet to be described.

End plate 12 is substantially identical to end plate 13. It includes side pressure passages 32 connecting to slots 17, 19, 21 and 23 which discharge to a central pressure passage 33 on the right-hand face of end plate 12. A central nib 34 is held by spider 35.

Venturi members 36, 37 are placed in each of slots 18, 20, 22, 24 to provide a region of reduced pressure immediately contiguous thereto. The venturi members are sloping partial obstructions of the slots, and operate on normal venturi principles. They are optional, and may be eliminated if not desired.

A rotor 40 is positioned inside the race. It has an outer cylindrical surface 41 of lesser lateral dimensions than those of the race so that it can freely roll around therein. The rotor has an axis 42. On its axis at ends 43, 44, respectively, there are nibs 45, 46 which are adapted to stand to the side of nibs 30 and 34, respectively, thereby to prevent the rotor from assuming a central position wherein axes 16 and 42 coincide, because in such a position, the vibrator is inoperative.

Ten plungers arranged in five sets of two each are provided in plunger passages disposed in the rotor. These sets are identified as sets 47–51, respectively, and sets 47 and 50 are shown in greater detail in FIG. 1, all sets being identical, and spaced equiangularly around the rotor, in the case illustrated every 72°. Set 47 includes a pair of plungers 52, 53, each fitted in a respective plunger passage 54, 55, which plunger passages are preferably, but not necessarily, disposed at an oblique angle both to the central axis and to a normal to the central axis.

The plunger passages are cylindrical and receive cylindrical shafts 56, 57. Each has a peripheral scavenging groove 58, 59 extending around it and spaced from the outer end thereof. Counter-sinks 60, 61 are sunk in the surface of the rotor to receive enlarged heads 62, 63 of plungers 52, 53, respectively. These heads are preferably formed with chamfers 64, 65 to most closely conform to the shape of that portion of the race which they contact during their operation.

Scavenging passages 66, 67 extend from scavenging grooves 58, 59, respectively, to a destination yet to be described. Plungers 52 and 53 and their passages have been shown in detail, it being understood that all of the other plungers and their passages are identical thereto, except disposed at 72° intervals, and connected to like elements similarly angularly spaced.

Expulsion means 70 is provided in the slots. This means includes bleed ports 71, 72 which pass through the wall of the race element from slots 18, 20, 22 and 24. Each of these means includes a check valve such as valves 73, 74, a suitable check valve comprising reeds 75, 76 held to the inner wall of the respective slots by screws 77, 78 or other suitable attachments. Greater pressure within the bleed port than in the respective slot will cause the reeds to deflect and permit fluid to pass therethrough and when the pressure drops, the reed will again close the respective bleed port.

FIG. 10 shows an optional embodiment of expulsion means. When this vibrator is used under high hydraulic heads, such as at the bottom of a well, the differential pressure drop across the vibrator is the same as it is under lesser heads, but, because there is no head behind the leakage fluid inside the race, the expulsion of it is more difficult. Accordingly, optional or additional means may be provided as shown.

Because slots 18, 20, 22 and 24 are needed for exhaust of working fluid, an additional slot, or set of slots 130 is formed in the outside of race element 131. Race element 131 is identical to race element 14, except that bleed ports 132, 133 intersect slots 130 instead of slots 18, 20, 22 and 24. Expulsion means 70 is optional when the means of FIG. 10 is used. If means 70 is not used, bleed ports 71 and 72 need not be formed in the race element, and the valves and venturis may be eliminated. Slots 130 are plugged by plugs 134 at the left end in FIGS. 1 or 10, so that they form a separate flow system. An exhaust pump 135 scavenges fluid in slots 130, through line 136, and boosts the fluid overboard or into exhaust passage 26. Pump 135 is thereby provided to assist leakage fluid out of the cavity against relatively high pressure heads.

Figure 4:
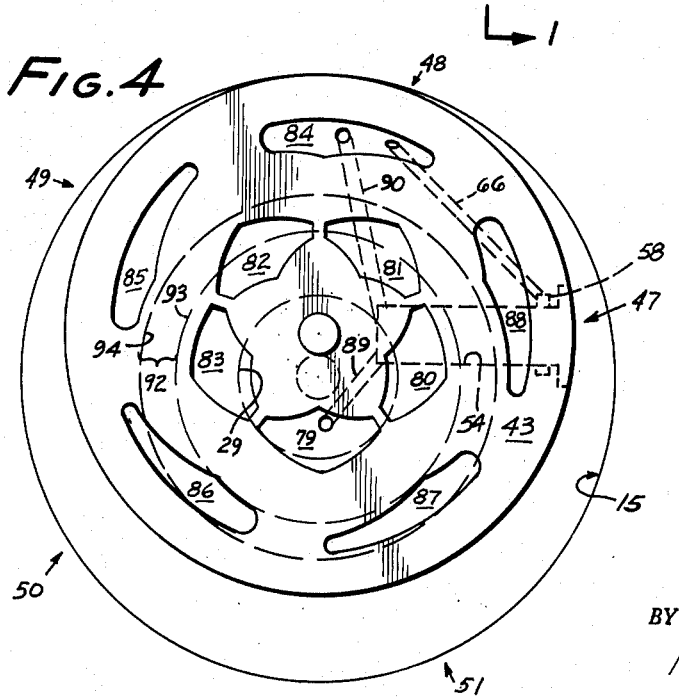
FIG. 4 is a detailed showing of certain valving provisions on the housing and the rotor.

FIG. 4 shows valving means for sequentially actuating the various plungers. Because of the large number of lines which would have to be shown to illustrate all of the elements, all the pressure and exhaust valving ports are as shown, but only one of the plunger passages is shown together with its connections to these various ports, it being understood that each of the other plunger passages will have like connections to the similar ports which are spaced apart by equal angles. For example, plunger passage 54 is shown in the rotor. Pressure valving ports 79–83, inclusive, are centrally formed in the end surface of the rotor. Exhaust valving ports 84–88 are formed in the end surface, radially outward of the pressure valving ports. Pressure and exhaust ports 79 and 84 are associated with set 47. Pressure and exhaust valving ports 80 and 85 are associated with set 48. Ports 81 and 86 are associated with set 49. Ports 82 and 87 are associated with set 50. Ports 83 and 88 are associated with set 51.

The surface shown is end 43. End 44 will have mirror-image construction with respect to all ports.

A plunger supply passage 89 is shown supplying plunger passage 54. A plunger exhaust passage 90 is similarly connected. Scavenging passage 66 interconnects scavenging groove 58 with exhaust valving port 84. Similar passages are provided for each of the other pressure and exhaust ports to each of the passages of the respective sets and scavenging grooves.

Both end plates have in addition to a central pressure valving port a peripheral exhaust port 92 having inner and outer concentric circular boundaries 93, 94, respectively. In FIG. 4, the size of the race is shown in the outer line, and the central pressure port and concentric exhaust port are shown in dashed line to illustrate the overlapping operation of the valving ports. End plates 12 and 13 both have similar ports.

FIGS. 7–9 illustrate portions of an optional embodiment of rotor, 100, which can be used in the invention. The various ports and passages have not been illustrated, because they are not germane to the feature being illustrated. The rotor has a generally cylindrical outer surface 101 and a central axis 102. Four plunger passages 103, 104, 105 and 106 are bored into the cylindrical surfaces skew to the central axis. Their axes 107 do not intersect the central axis, being offset therefrom. Plungers 108, 109, 110 and 111 are placed in passages 103–106, respectively. These plungers are identical to the plungers in FIG. 1.

Scavenging grooves 112 are formed in the walls of the plunger passages. Nibs 113, 114 are formed on the ends of the rotor.

More or fewer than four sets of plungers and plunger passages may be provided. Each set has ports and passages identical to those of FIG. 4, except that they may be more or fewer in number than in FIG. 4, and are angularly spaced apart by a different equal number of degrees. Apart from the angular and numerical relationships, the rotors of FIGS. 1 and 7 are essentially identical.

While the plungers in either embodiment may be made of a single, solid piece of material such as steel, certain problems arise which may be solved by the use of a piston made of a plurality of pieces of different materials. The two principal problems are the Brinelling of the race by the plungers, and of thermal expansion of the plunger shafts.

Figure 3:
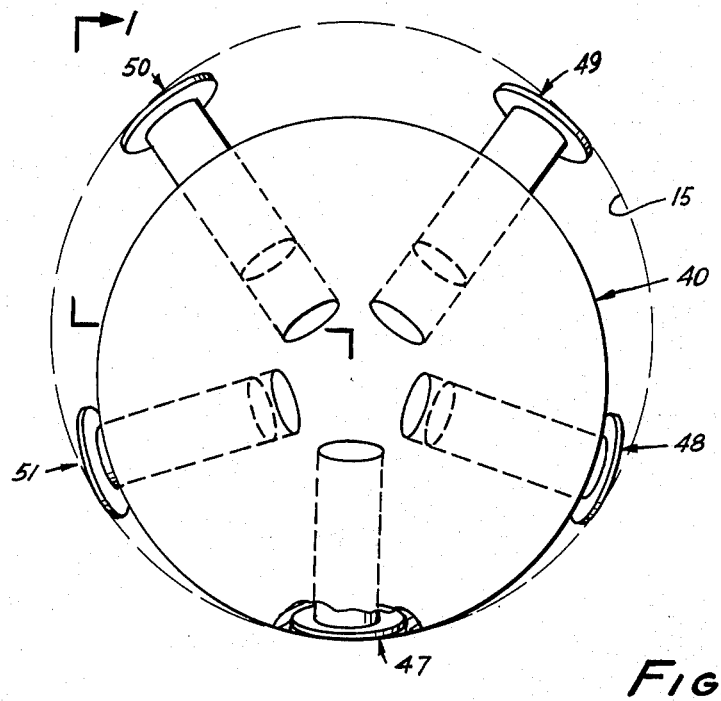
FIG. 3 is an end view of the rotor portion of FIG. 1.

A consideration of FIGS. 1 and 3 will show that when a piston is disposed at the point of tangency between the rotor and race, it imparts a force against the race which is transmitted to the plungers on the opposite side of the rotor. All of these latter plungers are in contact with the race, and some of them are backed up by pressurized fluid and others by fluid connected to exhaust pressure. These forces exerted by the race against the plunger are sharp and frequent, and when the plunger and the race are both made of steel, evidence of Brinelling can be seen. This can be avoided by utilizing a head 120 for plunger 121 which is made of a material which is toughly resilient, such as a fluoroelastomer. KEL–F, Zytel, Delrin, Lexar, and Teflon are examples. Such materials will not appreciably Brinell the race.

As the plungers reciprocate back and forth in their passages, they generate heat due to friction. The ends closer to the axis of the rotor are cooler because of their proximity to the motive fluid. However, the outer ends are not as well cooled, and shaft wear can occur at these regions. For this reason, elastomers, with rather greater thermal coefficients of expansion than many metals, are best not used as the sole shaft material. Instead, a core 122 of elastomer can be jacketed by a steel jacket 123, of lower coefficient of expansion, such as Invar, and the composite coefficient of expansion is thereby reduced, while good bearing surfaces are kept.

The operation of the device of FIGS. 1–6 will now be described with initial reference to FIG. 4 in which it will be noted that pressure valving port 79 overlaps the central pressure port 29 and that port 84 is out of communication with the exhaust port 92 (all in both end plates and rotor ends). Therefore pressure can be exerted at the inner end of plunger passage 54 to press its plunger laterally outward, an operation which will cause the rotor to rotate clockwise around its axis and thereby to roll around the race in a counterclockwise direction in FIG. 4, assuming that the race is held stationary. With this reaction, it will be observed that port 80 will shortly thereafter move out of communication with the central port, ports 81 and 82 are out of communication with it, and that port 83 is just coming into communication with it. From this, it will be seen that there will be a sequential going into registration of the pressure valving ports.

Similarly, it will be observed that exhaust valving ports 86 and 87 are in communication with the exhaust groove, and that port 88 will next go into registration with the exhaust groove, followed thereafter by ports 84, 85, 86 and 87. The important thing to note is that the connections to exhaust and pressure are substantially alternative, and about 180° apart, the respective pressure and exhaust ports being disposed substantially across the central axis of the rotor from each other, so that the pressure and exhaust connections are both alternative within each set and sequential among the sets whereby rolling operation of the rotor within the race is secured.

It will be noted that a certain amount of binding would ordinarily be expected between the surface of the plungers and the race, because the rotor rolls in the race, thereby rotating as it moves while the plungers are pressed firmly against the race. Binding is minimized in this device by tilting the plungers and running them on the surface of the chamfer so that shaft rotation is possible, thereby minimizing any binding forces. This is not a limitation on the generality of the invention, because plungers directed normally to the central axis are also useful.

Furthermore, all of the sets are shown in two bands around the rotor, but it will be understood that they could be staggered so as to distribute the wear on the surface of the race.

The operation of the device of FIGS. 7–9 is essentially identical. However, the offset relationship between the axes of the plungers and the central axis of the rotor has an important consequence. The rolling action in FIGS. 1–6 is derived from a combination of forces which are all exerted through the center of the rotor. Therefore, any torque on the rotor is derived only from friction between the race and the rotor. Initially the device is started simply by the plungers' moving the rotor around until it starts to spin.

In the device of FIGS. 7–9, the force exerted is both translational and rotational on the rotor. Quicker and easier starting is assured. There is a moment arm equal to the offset effective in starting. This moment arm is derived from the offset of the axes of reciprocation 108a, 109a, 110a and 111a, from central axis 102. Furthermore, an increased moment arm is obtained relative to the line of contact between rotor and race, the increase being equal to the offset. This feature, too, aids in the operation of the device.

The increased spin torque decreases frictional effects at the race and provides better starting and faster running than non-offset plungers.

The plunger of FIG. 9 can be substituted for the plungers in any of the other embodiments.

Generally speaking, the plungers of FIG. 7 are under expulsive pressure mainly from the time their clockwise-most edge (as shown in FIG. 7) is tangent to the race, through about another 45°–60° of progress of the tangent line around the rotor. The term "clockwise-most edge" with reference to FIG. 7 means that edge of the plunger which would lead the rest of the plunger were the rotor in FIG. 7 turned clockwise. For plunger 109, it is the lower edge in FIG. 7. At this time, the tendency of the race and plungers to wear each other is at a maximum, and can be reduced by increasing the area of their mutual contact. The offset arrangement of FIG. 7 does just that. During this portion of the travel, there is a significant increase of contact area over the arrangements shown in the other figures.

In the operation of both embodiments, any liquid that tends to collect between the rotor and the race will tend to accumulate just ahead of their line of contact. Pushing this fluid around, particularly if a considerable amount of it has accumulated, takes work, and therefore the expulsion means is provided. When the rotor rolls over the bleed ports, the pressure goes up at the port and some fluid is expelled. These vibrators operate at frequencies on the order of 5000 r.p.m. so that this expulsion action becomes very effective. In fact, it is so effective that sub-atmospheric pressures are developed in this region which is another advantage of the check valve, for as the device operates as a negative-pressure pump, the lower pressure inside the race makes the device more efficient and contributes noticeably to an increase in frequency.

This expulsion may be facilitated by either or both of two optional features. The first is the venturi effect provided by venturi members 36 and 37, which effect provides a region of lower pressure just adjacent to bleed ports 71 and 72. The power pressure is derived in accordance with typical venturi operation as a function of increased flow rate through the restricted region formed by members 36 and 37. This aids in clearing liquid from within the race.

The second optional feature resides in pump 26a which may be electrically or fluid-powered from a separate source, if desired. This pump lowers the pressure in the exhaust passages, and again aids in bleeding out the race. It also serves as a fluid boost to reservoir.

The term "race" is used herein to designate the entire inner wall with which the rotor interengages in any way. It includes both the paths rolled on by the rotor, and the paths engaged by the plungers. It will be understood that these paths could be separated, and the rotor not roll where the plungers contact, and the device would still be within the scope of this invention.

Throughout the specification and claims, it is recited that the propelling forces are derived from contact between the plungers and race. It is to be understood that these are, in turn, derived from the pressurized fluid behind the plungers.

The scavenging means along the plunger passages is connected to the exhaust valving ports and provides a convenient pathway for expulsion of seepage fluid which may pass along the shaft of the respective plungers. While some fluid will obviously pass beyond the scavenging grooves into the region between the race and the rotor, by far the greater proportion will be sent to the exhaust valving port.

This construction thereby provides a rugged plunger-operated vibrator with means for rendering it more effective in expelling fluid from unwanted regions and preventing excessive seepage along the plungers, and with angular relationships tending further to increase its speed. This vibrator is adapted to operate at relatively high frequencies on liquids and has few moving or wearing parts.

This invention is not to be limited by the embodiments shown in the drawing and described in the description which is given by way of example and not of limitation, but only in accordance with the scope of the appended claims.

I claim:

1. In a free rotor vibrator of the class wherein a cylindrical rotor rolls around inside a cylindrical race under the impulse of lateral forces exerted on the race by plungers carried within the rotor, extension forces being derived from application of elevated fluid pressure on said plungers to cause their extension and retractive forces being derived from application of lesser fluid pressure and from force derived from contact between the plungers and the race, the improvement comprising: plunger shafts for said plungers rotatably and reciprocably mounted in the rotor, expulsion means for expelling fluid from the region between the rotor and the race, and scavenging means for preventing the flow of fluid along the plunger shafts into said region.

2. Apparatus according to claim 1 in which the expulsion means includes a pump so disposed and arranged as to withdraw exhaust fluid from the vibrator.

3. Apparatus according to claim 1 in which the expulsion means comprises a passage through the wall of the race in connection with a lower pressure region and check valve in said passage.

4. Apparatus according to claim 3 in which the expulsion means additionally includes a venturi member adjacent to said passage and outside the race which maintains a reduced pressure to facilitate expulsion.

5. Apparatus according to claim 1 in which the scavenging means comprises a peripheral groove surrounding and in fluid communication with each of said shafts and at least part of the time in fluid communication with a region of lower pressure.

6. Apparatus according to claim 1 in which an enlarged head is provided on each of said shafts for contacting the race.

7. Apparatus according to claim 1 in which the rotor has a central axis, and in which the plungers have respective axes of reciprocation, the axes of reciprocation being skew to and offset from the central axis.

8. In a free rotor vibrator of the class wherein a cylindrical rotor rolls around inside a cylindrical race under the impulse of lateral forces exerted on the race by plungers carried within the rotor, extension forces being derived from application of elevated fluid pressure on said plungers to cause their extension and retractive forces being derived from application of lesser fluid pressure and from force derived from contact between the plungers and the race, the improvement comprising expulsion means for expelling fluid from the region between the rotor and the race.

9. Apparatus according to claim 8 in which the expulsion means includes a pump so disposed and arranged as to withdraw exhaust fluid from the vibrator.

10. Apparatus according to claim 8 in which the expulsion means comprises a passage through the wall of the race in connection with a lower pressure region and a check valve in said passage.

11. Apparatus according to claim 10 in which the expulsion means additionally includes a venturi member adjacent to said passage and outside the race which maintains a reduced pressure to facilitate expulsion.

12. Apparatus according to claim 8 in which the rotor has a central axis, and in which the plungers have respective axes of reciprocation, the axes of reciprocation being skew to and offset from the central axis.

13. In a free rotor vibrator of the class wherein a cylindrical rotor rolls around inside a cylindrical race under the impulse of lateral forces exerted on the race by plungers carried within the rotor, extension forces being derived from application of elevated fluid pressure on said plungers to cause their extension and retractive forces being derived from application of lesser fluid pressure and from force derived from contact between the plungers and the race, the improvement comprising: plunger shafts for said plungers which are rotatably and reciprocably mounted in the rotor, an enlarged head on each of said shafts for contacting the race, expulsion means comprising a passage through the wall of the race in connection with a lower pressure region and a check valve in said passage, for expelling fluid from the region between the rotor and the race, a scavenging means comprising a peripheral groove surrounding and in fluid communication with each of said shafts, and at least part of the time in fluid communication with a region of lower pressure, for preventing the flow of fluid along the plunger shafts into said region between the rotor and the race.

14. Apparatus according to claim 13 in which the rotor has a central axis, and in which the plungers have respective axes of reciprocation, the axes of reciprocation being skew to, and offset from, the central axis.

15. Apparatus according to claim 13 in which the plunger shafts include a peripheral jacket and a central core, the thermal coefficient of expansion of the jacket material being less than that of the core material, and in which the head is made of a material which is more toughly resilient than the race whereby to reduce Brinelling effects thereon.

16. In a free rotor vibrator of the class wherein a cylindrical rotor rolls around inside a cylindrical race under the impulse of lateral forces exerted on the race by plungers carried by, and axially reciprocable relative to, the rotor, extension forces being derived from application of elevated fluid pressure on said plungers to cause their extension and retractive forces being derived from application of lesser fluid pressure and from force derived from contact between the plungers and the race, said rotor having a central axis, and the plungers having respective axes of reciprocation, the improvement comprising: so disposing and arranging the axes of reciprocation as to be skew to, and offset from, said central axis.

17. In a free rotor vibrator of the class wherein a cylindrical rotor rolls around inside a cylindrical race under the impulse of lateral forces exerted on the race by plungers carried within the rotor, extension forces being derived from application of elevated fluid pressure on said plungers to cause their extension and retractive forces being derived from application of lesser fluid pressure and from force derived from contact between the plungers and the race, the improvement comprising: a plunger shaft for each plunger which includes a peripheral jacket and a central core, the thermal coefficient of expansion of the jacket material being less than that of the core material and a head attached to each core, which head is made of a material which is more toughly resilient than the race, whereby to reduce Brinelling effects thereon.

References Cited by the Examiner

UNITED STATES PATENTS 2,743,090  4/1956  Malan.
2,891,775  6/1959  Malan.
2,988,337  6/1961  Malan _____ 259—1

WALTER A. SCHEEL, *Primary Examiner.*